United States Patent [19]
Carlson et al.

[11] Patent Number: 5,384,492
[45] Date of Patent: Jan. 24, 1995

[54] PROTECTIVE SYSTEM FOR INSERTION/EXTRACTION OF PC BOARDS IN A POWERED-UP ENVIRONMENT

[75] Inventors: Robert H. Carlson, Laguna Niguel; Daniel L. Baker, Rancho Santa Margarita, both of Calif.

[73] Assignee: Unisys Corporation, Blue Bell, Pa.

[21] Appl. No.: 979,141

[22] Filed: Nov. 20, 1992

[51] Int. Cl.⁶ .............................. H02H 7/20
[52] U.S. Cl. ..................... 307/147; 307/149; 361/9; 361/788; 361/799
[58] Field of Search ............. 307/147, 149; 361/8, 361/9, 58, 111, 785, 788, 796, 799

[56] References Cited

U.S. PATENT DOCUMENTS

| | | | |
|---|---|---|---|
| 3,993,935 | 11/1976 | Phillips et al. | 361/748 |
| 4,079,440 | 3/1978 | Ohnuma et al. | 361/424 |
| 4,245,270 | 1/1981 | Busby | 361/58 |
| 4,454,552 | 6/1984 | Barnes et al. | 361/9 |
| 4,510,553 | 4/1985 | Faultersack | 361/413 |
| 5,077,675 | 12/1991 | Tam | 364/480 |
| 5,210,855 | 5/1993 | Bartol | 364/514 |
| 5,272,584 | 12/1993 | Austruy et al. | 361/58 |

OTHER PUBLICATIONS

Brady Barnes "Insert Board into a Live System without any Hitches"; pp. 75–80; Electronic Design for May 11, 1989.

*Primary Examiner*—Jeffrey A. Gaffin
*Attorney, Agent, or Firm*—Alfred W. Kozak; Mark T. Starr; Stanton D. Weinstein

[57] ABSTRACT

An apparatus and method for handling the connection/disconnection transition period of a printed circuit board to an actively empowered backplane which eliminates damaging surge currents and glitches by the use of temporarily functioning field effect transistor circuits which gradiently handle the current loads during the transition period. A set of specifically sized and predetermined lengths of connecting pins on the backplane insures that a programmed sequence of power connection and/or disconnection will occur which permits a group of field effect transistors to gradiently carry the changing current loads that occur during the insertion of the printed circuit board into the backplane. Likewise, during extraction of the printed circuit board from the backplane, the group of FETs (Field Effect Transistors) will carry and buffer the changing current loads from de-stabilizing the power supply source unit.

6 Claims, 3 Drawing Sheets

PROTECTIVE SYSTEM FOR INSERTION/EXTRACTION OF PC BOARDS IN A POWERED-UP ENVIRONMENT

FIELD OF THE INVENTION

This disclosure refers to methods and apparatus by which PC Boards or digital computer cards can be inserted or extracted without need to turn off power in the system.

CROSS REFERENCES TO RELATED APPLICATIONS

This disclosure is related to a co-pending patent application entitled "Module Insertion/Extraction System with Power Control Capability" filed on Apr. 9, 1993 as U.S. Ser. No. 045,562.

BACKGROUND OF THE INVENTION

A standard practice in modern day digital modules and computer systems is the use of printed circuit boards which are inserted and detached from a backplane in a supporting module. The printed circuit boards or digital cards will carry integrated circuit and other electronic resource elements which can, in total, often require large currents, often up to 50 amperes or more.

As long as the insertion of printed circuit boards into the backplanes is effectuated and the removal of printed circuit boards is effectuated during the times when no power is applied to the system, then there is no general problem in regard to the insertion and extraction of the printed circuit boards into the backplane connectors.

On the other hand, it is often not only desirable but necessary to remove and also reinsert printed circuit boards while the system is in a powered-up condition. Under these circumstances a certain number of problems and difficulties can arise during the course of insertion/extraction under power-up conditions.

When a printed circuit board or electronic card is inserted or extracted from a live system such as a backplane connector, a number of difficulties could arise. For example, power on the backplane could be disrupted thus bringing down the system. And then the problem of "rebooting" the system would take considerable time and effort to accomplish.

Additionally, viable data could be lost. Pins could be damaged from arcing current since the load would act as a short thus drawing a large surge of current through the first power pin to make contact. Also, the devices installed and located on the PC board or card could be damaged due to "latch-up" if the ground pin and the signal pin made contact before the voltage $V_{cc}$. Thus a current surge shock could damage certain types of electronic circuits and freeze them so as to make them inoperable.

When the various pins of the backplane are caused to be connected and inserted into the female sockets of a PC Board Card, there is no guarantee that the various connections will take place simultaneously in time. Quite contrarily, there is no simultaneous-in-time connection which occurs and under these conditions certain conditions can occur which will cause damaging current surges and/or voltage glitches to occur in nearby circuits which can be conducive to error signals in these circuits.

Thus the extending fingers on the edge connector of a backplane motherboard will make various different points-in-time connections when a printed circuit card is plugged into the hot socket. Under these conditions the order in which the power and ground signals make contact will determine whether or not difficulties will be caused.

If the ground pin and the signal pin make contact before the power pin is connected, then integrated circuits connected to these fingers will take a voltage applied at their I/O pin before power is actually applied. This can cause what is described as a "latch up" in which there can occur a very low impedance path between different power supply lines. Currents may be generated to the point of even physical damage.

Another situation can occur when the power pins of a multiple-power supply system make contact before the ground pin makes contact. Under this situation many capacitors are often placed in series between the power pins, and since the capacitors are initially completely discharged, then the initial voltage at the ground will fall somewhere between the applied voltages depending upon the level of the capacitances. This results in a situation that the ground pin may be at a higher potential than the lower voltage power pin causing the cards (PC Boards) digital logic to be reversed.

Another type of unfortunate situation can occur when a cold unpowered printed circuit board, with its capacitors uncharged, is plugged into a hot socket backplane. The inrush of current from the power and ground traces will charge the capacitors and if no special circuitry is present to contain this current, then the uncharged capacitor will briefly cause a short between power and ground which causes a voltage glitch to appear on the backplane. This voltage glitch can be transmitted and appear at other cards plugged into the backplane near the card that is being inserted. This can corrupt data on other cards and even cause system failure.

One solution often suggested in these hot card insertion situations is that described in the magazine *Electronic Design* of May 11, 1989 in an article entitled "Insert Boards Into a Live System Without Any Hitches" located at pages 75 thru 80.

This article suggests that the printed circuit board's edge connectors can help solve some of these problems associated with hot-socket insertion by customizing different finger lengths of the edge connector so that the timing of various traces, grounds and signals can be controlled during insertion and extraction.

The present disclosure uses the concept of different length connective fingers in order to regulate the time of connection between the backplane and the PC Board and additionally provides specialized field effect transistor circuitry on the card which further prevents any problems occurring in the nature of shorted lines that might cause heavy currents or glitches which could corrupt signals in the vicinity.

Attempts in the prior art to partially handle the situation of insertion and extraction of cards in actively powered modules were very ineffective and cost consuming. Most of the earlier methods could not handle card loads greater than 35 milliamperes. Also, the early ideas of precharging the card capacitance would only work very limitedly for a very small load carrying card which consumed 35 milliamperes or, less but could not be used for cards drawing larger load currents.

The present system enables and it uses precharge pins, but not to attempt to precharge the capacitance of a high density current card such a 50 ampere card or PC board. In these cases, a series resistor would not be sufficient to control the loading effects.

The capacitive and DC loading effects of a card which draws 35ma to 50 amperes or greater requires a different approach to control the surges. The presently described circuitry takes into account all the possible capacitive and DC loading effects, uses only about 1½ square inches of board space, consumes only about 2.5 milliamps for FET (field effect transistor) gate control and costs only a few dollars per board so as to handle up to 50 ampere load currents. Additionally, the present circuitry can be expanded or reduced to fit mode requirements by simply adding or subtracting the number of field effect transistors involved.

SUMMARY OF THE INVENTION

The present invention permits printed circuit boards and computer cards used in digital modules to be inserted or extracted from an operative system without having to turn off power in the system.

The system provides for a series of different length finger connection extensions which provide a timing factor between the connection of signal pins and power and ground pins, so that no short circuit, no reversal of circuit voltages nor voltage glitches, can occur during the insertion/extraction period of a powered system. The present circuit system is compact, has a low noise factor, is low in cost and can be used for printed circuit cards ranging from zero to hundreds of amperes. The present system provides a set of backplane power pins which are 6 in number in that the first precharge voltage pin and the first precharge Gate pin are the longest in length "L", while the second set of two pins are the card voltage $V_{cc}$ pin and the field effect transistor ground pin are essentially two thirds L, in length. Then the fifth pin is a direct ground pin which is one-tenth to one-twelfth L in length and the sixth final pin is the RAMP circuit pin which is one-third, L to one-half in length the signal-carrying pins 8 to the resource elements in FIG. 1 are all seen to be shorter in length than any of the power pins.

These pins are of such length, that when the connection is made, the printed circuit card cannot receive power until the attached field effect transistors (FETs) are turned on.

Likewise, in the extraction sequence, the direct ground contact is broken and the load is transferred to the field effect transistors (FETs) such that the field effect transistors are turned off at a controlled rate. Thus the power supply load is removed at a slow enough rate for the power supply to react so that no backplane voltage surges occur.

BRIEF DESCRIPTION OF THE DRAWINGS

The FIG. 1 is drawing of the backplane showing the signal connection pins and the backplane power pins having different size lengths.

DESCRIPTION OF PREFERRED EMBODIMENT

Figure 1:
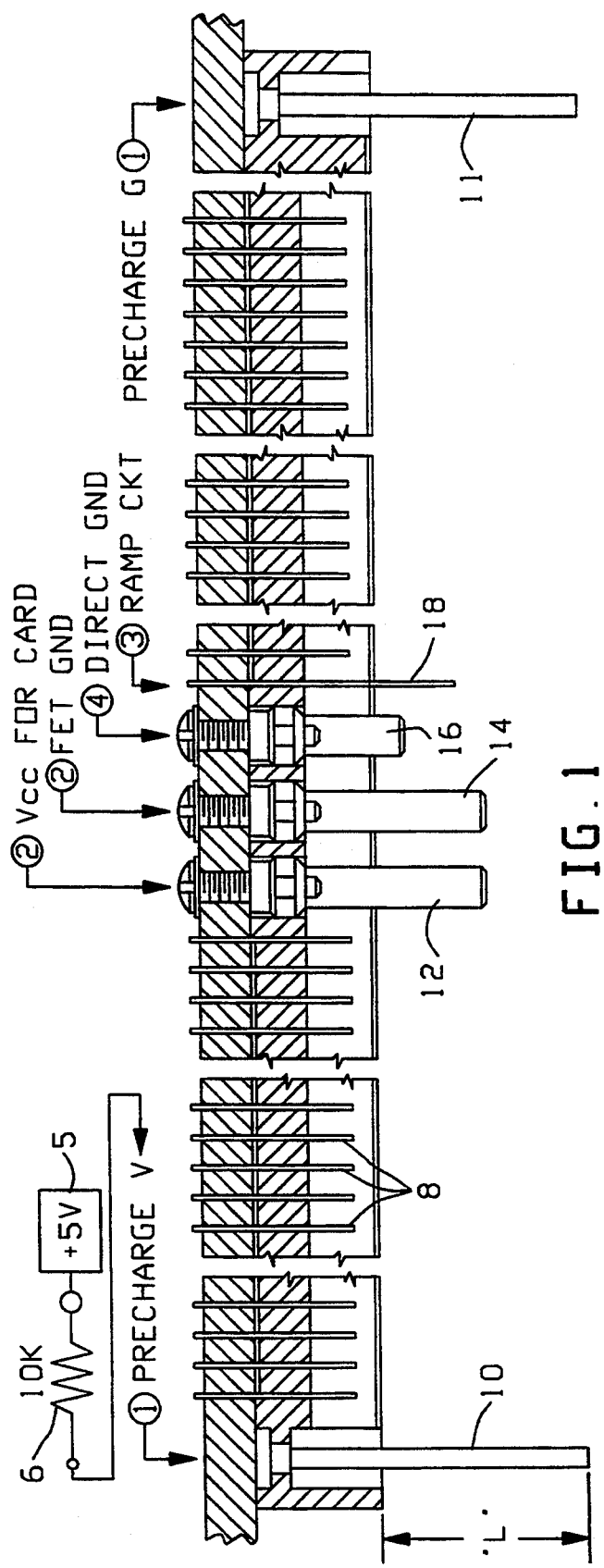

As seen in FIG. 1, there is evidenced a side cut-away view of the male connecting pins of the backplane 7 of a digital module. The normal signal connecting pins are shown as items 8. These may involve as high as 400 signal line pins. The actual "power" pins of the backplane 7 are seen as elements 10, 11, 12, 14, 16, 18. The precharge voltage pin 10 which is seen to be connected through a 10,000 ohm resistor 6 to +5 volt power supply source 5.

Figure 2:
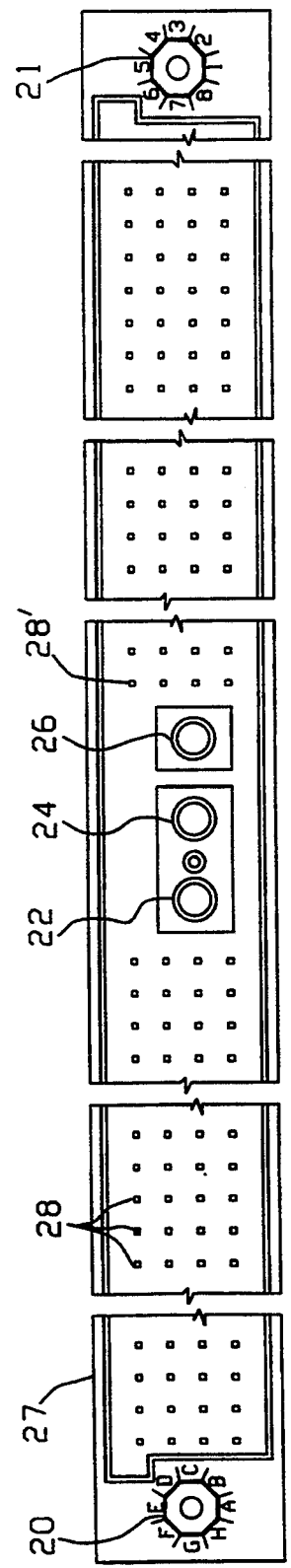
FIG. 2 is a drawing of the corresponding pin sockets of the printed circuit board card which correlate to the various male pins of the backplane unit.

The precharge voltage pin 10 will thus be seen to convey a 5 volt potential into the socket 20 of the PC Card of FIG. 2. The precharge voltage of pin 10 is seen to have a length L. Of comparable length "L" is the Precharge Ground pin 11 which puts a ground line on the Source Terminals S of the Field Effect transistors in FIG. 3.

The shorter power pin in FIG. 1 is designated pin 12 and may have a length of "⅔ L" to ¾ L and provides the 5 volt voltage ($V_{cc}$) for the printed circuit card's operating elements.

Figure 3:
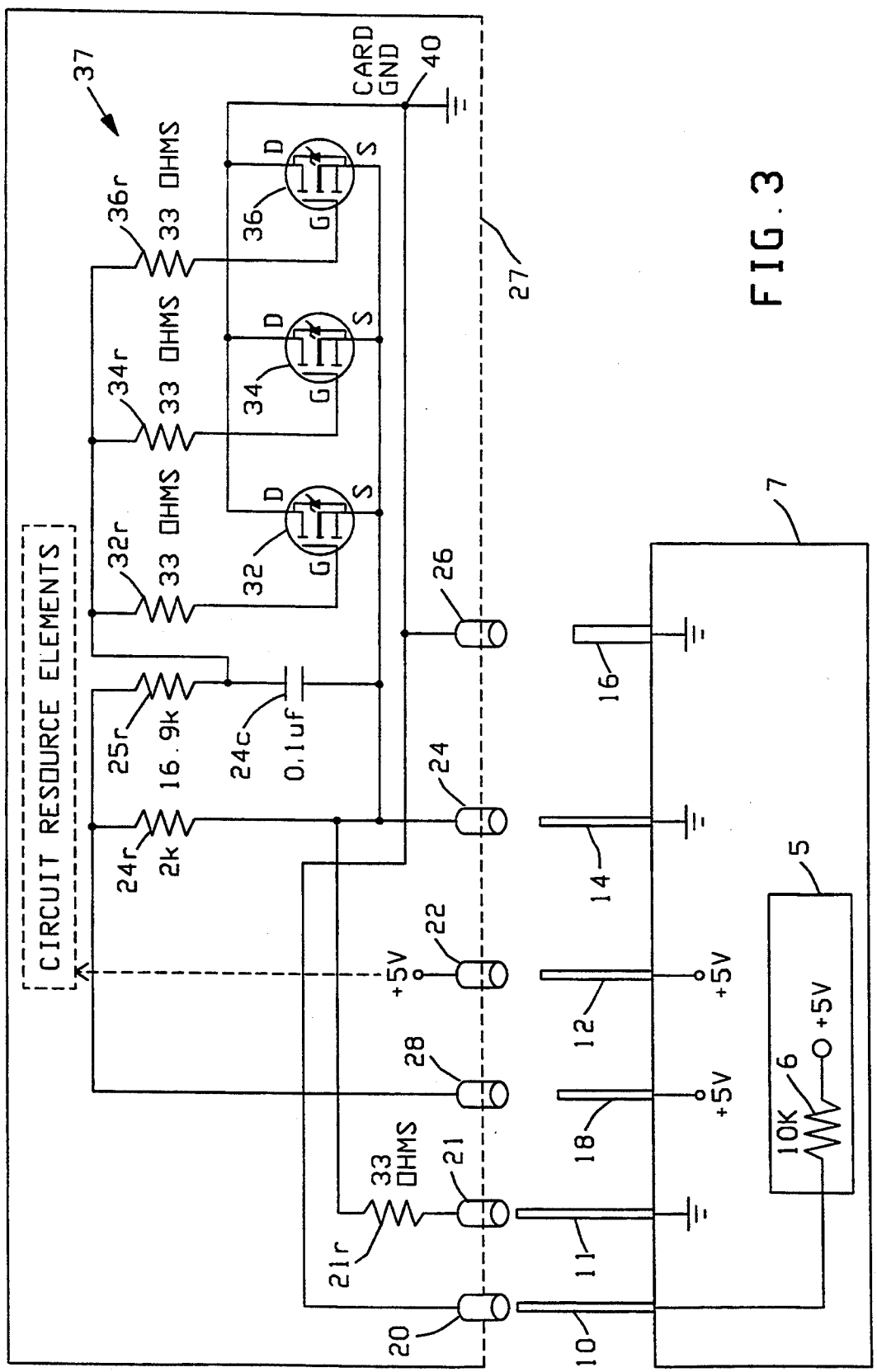
FIG. 3 is a schematic drawing showing the backplane power pins in relationship to the connecting female sockets of the printed circuit card which provides circuitry making use of three field effect transistors.

In FIG. 1 the power pin 14 is comparable to pin 12, and is seen also to have a length of "½ L" which provides a ground line for the S terminals of the field effect transistors of FIG. 3 designated as items 32, 34, and 36.

The shortest pin 16 shown in the backplane 7 of FIG. 1 is the direct ground pin and this is seen to have a length of "¼" L to ⅛ L so that it is the shortest pin of the power group of pins.

The last or sixth pin is pin 18 which is shown having a length of ⅓ L, and which can range from ⅓ L to ½ L, and provides the +5 voltage RAMP circuitry potential for the Gate G terminal of each of the three field effect transistors 32, 34, and 36.

Now referring to FIG. 2 it will be seen that the many normal signal carrying pins, 8, from FIG. 1, will fit into the sockets 28 of the printed circuit card 27. Further, it will be seen that the precharge voltage pin 10 fits into the socket 20, the card voltage pin 12 will fit into the socket 22 of FIG. 2, the field effect transistor ground pin 14 will fit into the socket 24 and the direct ground pin 16 of FIG. 1 will fit into the socket 26 of the FIG. 2. Likewise, the RAMP circuit pin 18 of FIG. 1 will fit into the socket 28 of the PC Card 27.

Due to the nature of the lengths involved, it will be seen that when the PC Card socketry is inserted against the backplane power pins, then the sequence of connection will take place according to a certain order which is shown in FIG. 1 with the encircled numbers as 1, 1, 2, 2, 3, 4. Thus during connective insertion, the first-in-time connection will be made by the pins 10, 11. The second-in-time connection will be made by the pins 12 and 14, the third-in-time connection will be made by the pin 18 and the final-in-time sequence connection will be made by the pin 16. After this, the signal pins 8 will make their connections to the circuit resource elements in FIG. 3.

FIG. 3 shows a composite drawing of the backplane 7 and the printed circuit card 27. As seen in FIG. 3 the backplane 7 has a +5 voltage source shown as element 5. The +5 voltage source is connected through a 10,000 ohm resistor 6 over to the precharge voltage pin 10. Additionally, the +5 voltage source is connected to the RAMP circuit pin 18 and the voltage pin 12.

The backplane 7 is also seen to have certain of its pins connected to ground. These pins are the precharge G pin 11, the field effect transistor ground pin 14, and the direct ground pin 16. It will be noted that the length of these particular pins will determine the time sequence into which they make connection, and as well as disconnection during an extraction sequence.

Again in FIG. 3 the printed circuit card 27 is seen to have the female sockets 20, 21, 28, 22, 24, and 26, which correlate to the pins from the backplane designated as 10, 11, 18, 12, 14, and 16.

The PC Card 27 has circuitry which is seen to provide three field effect transistors 32, 34, and 36. Each of these transistors will have certain connections designated as S for Source, G for Gate and D for Drain.

It will be noted that each of the three drain (D) connections of the field effect transistors (FET) connect to a card ground 40 and also connect to the direct ground 26 (after an insertion timing sequence). The Drain (D) terminals of the FETs also connect to the precharge voltage socket 20 which can connect to the male pin 10. Of course, the pins 10 and 11 will first connect to the sockets 20, 21, before the direct ground connection 16 can connect to the socket 26. Likewise on extraction, the direct ground 16 will disconnect from the socket 26 before there is a disconnection between the precharge voltage and ground pins 10, 11, and their sockets 20, 21.

The precharge ground pin 11 is seen to connect to the socket 21 of the card 27 such that a precharge voltage of 5 volts will be fed through the 33 ohm resistor designated $21_r$, which will connect to the source terminals (S) of each of the field effect transistors 32, 34, and 36 and additionally will connect to the 2,000 ohm resistor $24_r$ and also to the capacitor $24_c$. The 16.9 thousand ohm resistor $25_r$ is seen connected from the capacitor $24_c$ over to the resistor $24_r$. Then the dividing line between the resistor $25_r$ and capacitor $24_c$ provides a connection line over to the three 33 ohm resistors designated as $32_r$, $34_r$, and $36_r$, each of which respectfully connect to the Gate terminal (G) of the field effect transistors 32, 34, and 36.

The backplane 7 is seen to have the pins 12 and 14 of the same length so that there is a mutual in a time connection to the sockets 22 and 24. This will insure that the pin 12 will provide a 5 volt potential to the card 27 and also the FET ground pin 14 will connect to the socket 24 to provide a ground to the source terminals S of each of the FET transistors 32, 34, 36 and also a ground to the resistor $24_r$ and capacitor $24_c$.

The RAMP circuit pin 18 will be seen to subsequently connect to the socket 28 in order to provide a 5 volt potential to the resistors $24_r$ and $25_r$, which after an RC time lag, will be applied the FET gate-terminals G.

Figure 4:
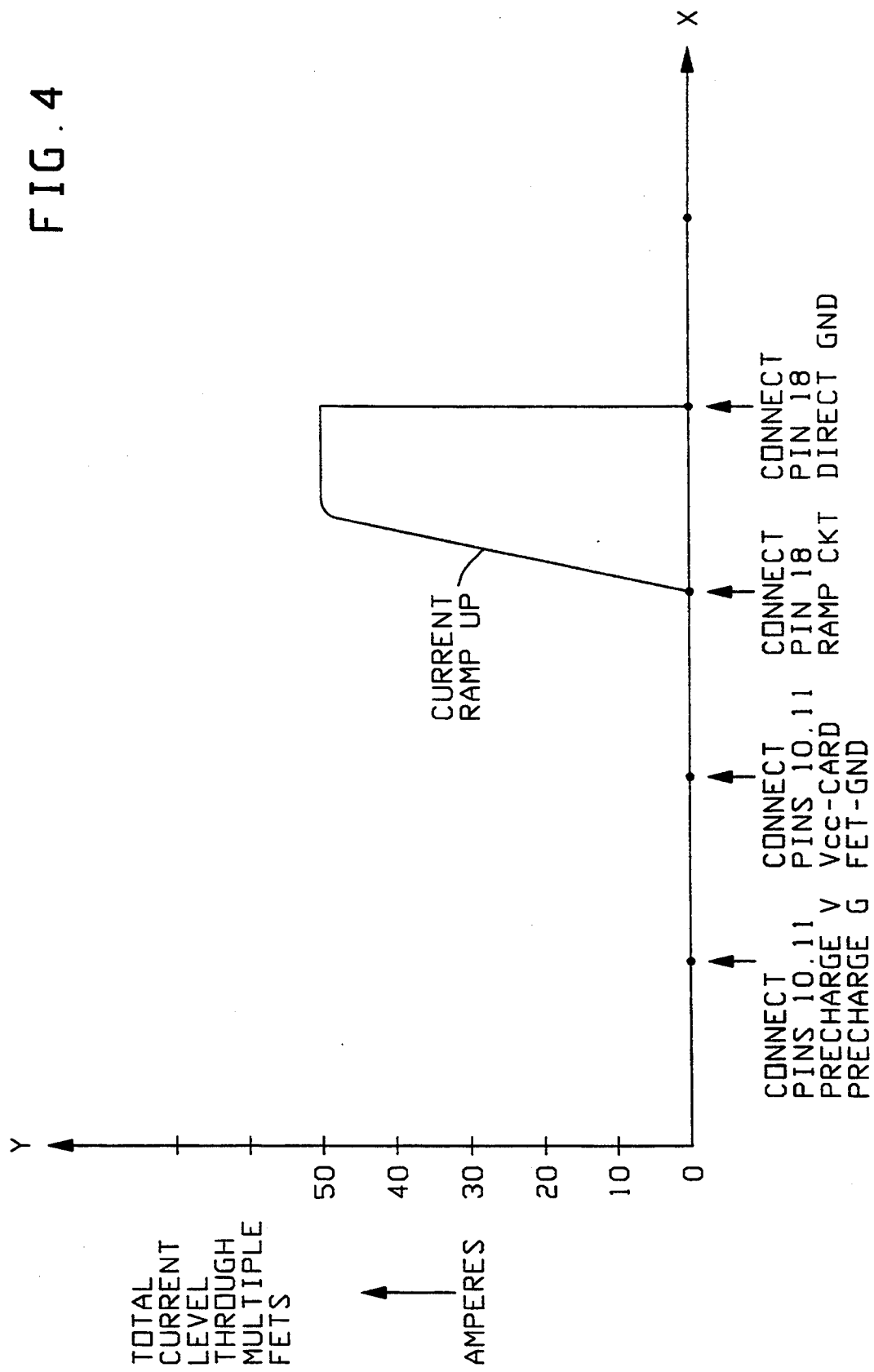
FIG. 4 is a graph showing when gradient current conduction occurs in the field effect transistors during the insertion-connection sequence.

FIG. 4 is a diagram illustrating the gradient current sequence ramp which occurs when the connecting pins of the circuitry of FIG. 3 are being placed into contact in the sequential order shown.

The X axis indicates the various time periods and the sequence in which the connecting pins 10 and 11 are providing the precharge voltage and the precharge ground signal. It will be noted on the Y axis that there is initially no current operating through the field effect transistors. The Y axis will show various amperage ratings from 0 through 50 amps which is possible through the use of multiple FETs, field effect transistors.

The next connection occurring is through pins 12 and 14 which are the card voltage VCC and the ground connection to the field effect transistors. Still no current has occurred through the field effect transistors.

At the time moment where pin 18 has formed its connection, designated as the RAMP circuit connection, there is a gradient build up of current through the field effect transistors (FETs) which will taper off at the 50 amp level. Later at the moment where the pin 16 is connecting to direct ground, the current through the field effect transistors will abruptly stop.

Thus the three field effect transistors will ramp up and carry currents momentarily, and thus eliminate the inrush currents until all the connections are made and the normal power can be supplied to the electronic resource elements on the PC Board.

FUNCTIONAL OPERATION

The presently described hot card insertion/extraction circuit system can be seen to use single or multiple field effect transistors and multiple pin length connectors to turn power on and off to the connecting circuit board or PC Card 27. This method and technique insures that the PC Card can be inserted or extracted without affecting the normal empowered backplane voltage in a fashion which could generate voltage spikes or current overloads.

A sequence of events occurs when a PC Board or Card 27 is inserted into or extracted from a powered backplane 7 such as shown in FIG's. 1 and 2. The order or timing of the important events is controlled by the connector pin lengths shown in FIG. 1.

INSERTION SEQUENCE

Referring to FIG. 1 and 2, the "insertion" sequence consists of the following series of events:

(1) The first contacts occur through the precharge voltage pin 10 and precharge ground pin 11. The precharge pin 10 charges the source-S-to-drain-D capacitance of the field effect transistors 32, 34, 36 through the 10,000 ohm resistor 6 of FIG. 1. This is done to prevent premature switching of the field effect transistors which could be caused by capacitive coupling to the gate G. The 33 ohm resistors $32_r$, $34_r$, and $36_r$ limits this charge rate to prevent possible feedback to the gate G. These resistors also limit the power dissipated through the precharge pins 10 and 11.

(2) Next in sequence, the field effect transistor ground pin 14 and the voltage $V_{cc}$ pin 12 for the card 27 will make contact with sockets 24 and 22. At this point, the card 27 still does not have power available since the ground path to the card cannot be completed until the field effect transistors 32, 34, and 36 are turned on.

(3) The next pin to make sequential contact with socket 28 is the RAMP circuit pin 18. This pin is connected to the 5 volt supply on the backplane 7. When the voltage potential reaches the gate G of FETs 32, 34, 36, the FET is turned "on" at a "controlled rate" which is determined by the RC time constant established by the 16.9K resistor $25_r$ and the 0.1 microfarad capacitor $24_c$.

The time it takes to charge the FET gate G (usually less than five milliseconds) is enough to insure that the load incurred on the power supply by the card 27 is slow enough so that the power supply has time to easily respond, without sudden large variations. By the time the next pin makes contact, the card will be fully powered on with the ground path to the card 27 having been established through the fully turned on field effect transistors 32, 34, and 36.

(4) The next pin in time sequence to make contact will be the direct ground pin 16 which will develop a path of least resistance and will begin conducting and supplying the card current for card 27. The field effect transistors 32, 34, and 36 will then be "bypassed", since the card current is being carried now through the direct ground pin 16.

Thus the FETs 32, 34, 36 will only be actively "conducting" during the "insertion-time period", as indicated in FIG. 4.

EXTRACTION SEQUENCE

The extraction sequence occurs in the reverse order from that of the insertion connection sequence. In this respect the sequence of steps will be numbered as 5, 6, 7, 8, as follows:

(5) The extraction sequence starts with the direct ground pin 16 being broken in contact. The field effect transistors 32, 34, 36 are already charged and turned "on", so that the current load is then transferred back through the field effect transistors (FETs).

(6) The next contact to be broken is the RAMP circuit pin 18. The gate G to the field effect transistors 32, 34, 36 is then turned off at a controlled rate as determined by the RC time constant established by the 0.1 microfarad capacitor and 16.9K resistor and the 2K resistor designated respectively as 24$_c$, 25$_r$, and 24$_r$. Thus the current through the FETs will gradiently diminish to zero.

As with the insertion sequence, the power supply load is thus removed at a rate that is slow enough for the power supply to react so that no backplane voltage surges can occur.

(7) The next two pins to break contact, which will be approximately at the same moment in time, will be the VCC pin 12 and the FET ground pin 14. At this time, the card is already powered down and no current is flowing through the FET circuitry so that there will not be any further influence on the backplane power supply 5.

(8) The next two pins to break contact are the precharge V voltage pin 10 and the precharge G gate pin 11 which have charged the source-S-to-drain-D capacitance of the field effect transistors. Since the source S-to-the-drain-D impedance is high, the precharge pins 10 and 11 are then not conducting any current.

The 33 ohm damping resistors on the gates G of the field effect transistors are indicated as resistors 32$_r$, 34$_r$, and 36$_r$. These will prevent oscillation during turn-ON or turn-OFF. The other 33 ohm resistor 21$_r$ which connects to the source terminals (S) of the field effect transistors 15 used to limit the current through the precharge ground pin 11 whenever the field effect transistors are turned ON.

In summary, the insertion sequence and the extraction sequence can be summarized as follows.

INSERTION SEQUENCE

1. Connect precharge pins (10,11).
2. Connect V$_{cc}$ and FET Card Ground Pins (12, 14).
3. Connect RAMP circuit pin (18) to RAMP up voltage on FET gate and to RAMP up card current.
4. Bypass the FET ground (pin 14) by connecting the Direct Ground (pin 16).

EXTRACTION SEQUENCE

5. Disconnect direct ground (16) and go through the FET ground (14) which is now carrying current from FETs.
6. RAMP down voltage on gate G (of FETs) and RAMP down card current by disconnecting the RAMP circuit pin (18).
7. Disconnect the V$_{cc}$ pin (12) and the FET card ground pins (14).
8. Disconnect the precharge pins (10,11).

It should be noted that the field effect transistors 32, 34, and 36 will conduct only during the insertion/extraction process and at no other time.

What is claimed is:

1. Apparatus for minimizing rapid current variations in a power supply supplying the circuitry elements of a printed circuit board comprising:
   (a) a backplane for connection to said printed circuit board, said backplane including:
      (a1) a plurality of male connecting pins of specified different lengths which initiate a timed sequence period of connection to the female sockets of said printed circuit board;
      (a2) an N-Volt power supply supplying N volt potential to particular ones of said male connecting pins;
   (b) said printed circuit board including:
      (b1) a plurality of female connection sockets which align correspondingly to said male connection pins;
      (b2) a current variation minimization circuit which acts to slow down changes in current drawn by said printed circuit board from said N-volt power supply during the said sequence period of connection, said current variation minimization circuit including:
         (b2a) a plurality of Field Effect Transistors (FET) forming a FET Group, each FET having a Source Terminal (S), a Gate Terminal (G), and a Drain Terminal, (D);
         (b2b) resistor-capacitor circuit elements connecting said N-volt power supply to each Gate G of said FET Group;
         (b2c) a card ground connecting each Drain D to a ground terminal on said printed circuit board;
         (b2d) said Source S of each FET group connected to a precharge ground socket terminal on said printed circuit board.

2. The apparatus of claim 1 wherein said plurality of male connection pins includes:
   (a) a first precharge voltage pin of length "L" providing an N-volt potential from N-volt power supply;
   (b) a second precharge ground pin of length "L" providing a preliminary ground connection to said backplane;
   (c) a third voltage (V$_{cc}$) pin of length range from ⅜ L to "¾ L" for providing N-volts to power said circuitry elements on said printed circuit board when connected to said printed circuit board;
   (d) a fourth FET ground pin of length range from ⅜ L to "¾ L" for backplane grounding the Source (S) terminals of said Field Effect Transistor (FET) Group when connected to said printed circuit board;
   (e) a fifth ramp circuit pin of length range of ⅛ L to ½ L for providing said N-volt potential to said Gate terminals of said FET Group when connected to said printed circuit board;

(f) a sixth direct ground pin of length range 1/10 L to ¼ L for applying a backplane ground connection to said drains D of said FET Group when connected to said printed circuit board.

3. Apparatus for minimizing rapid current variations in an N-volt power supply supplying the circuitry elements of a printed circuit board comprising:

(a) a backplane to be disconnected from its connection to said printed circuit board, said backplane including:

(a1) a plurality of male connection pins of specified different lengths which initiate a time sequence period of disconnection to the female sockets of said printed circuit board;

(a2) an N-Volt power supply supplying N volt potential to particular ones of said male connection pins;

(b) said printed circuit board including:

(b1) a plurality of female sockets which align correspondingly to said male connection pins;

(b2) a current variation minimization circuit which acts to slow down changes in current drawn by said printed circuit board from said N-volt power supply during the said sequence period of disconnection, wherein said current variation minimization circuit includes:

(b2a) a plurality of Field Effect Transistors (FET) forming a FET Group, each FET having a Source Terminal (S), a Gate Terminal (G), and a Drain Terminal, (D);

(b2b) resistor-capacitor circuit elements connecting said N-volt power supply to each Gate G of said FET Group;

(b2c) a card ground connecting each Drain D to a ground terminal on said printed circuit board;

(b2d) said Source S of each FET group connected to a precharge ground socket terminal on said printed circuit board.

4. The apparatus of claim 3 wherein said plurality of male connection pins, when connected to said printed circuit board, includes:

(a) a first precharge voltage pin of length "L" providing an N-volt potential from said N-volt power supply;

(b) a second precharge ground pin of length "L" providing a preliminary ground connection to said backplane;

(c) a third voltage ($V_{cc}$) pin of length range from ⅔ L to ¾ L for providing N-volts to power said circuitry elements on said printed circuit board when connected to said printed circuit board;

(d) a fourth FET ground pin of length range from ⅔ L to ¾ L for backplane grounding the Source (S) terminals of said Field Effect Transistor (FET) Group when connected to said printed circuit board;

(e) a fifth ramp circuit pin of length range from ⅓ L to ½ L for providing said N-volt potential to said Gate terminals of said FET Group when connected to said printed circuit board;

(f) a sixth direct ground pin of length range 1/10 L to ¼ L for applying a backplane ground connection to the drains D of said FET Group when connected to said printed circuit board.

5. In a system for connecting a digital module holding electronic resource elements and a temporary load-control means using a group of field effect transistors (FETs), to an empowered backplane holding an N-volt power source and a set of connecting pins of predetermined different lengths which will enable a time-sequenced set of connection between said backplane and digital module, a method for minimizing variations in current-load on said power supply comprising the steps of:

(a) firstly, connecting a set of two pins of length L to charge the Source-Drain capacitance of a group of field effect transistors (FETs) to initially prevent conduction through said FETs;

(b) secondly, connecting a set of 2 pins, each of approximate length, ⅔ L, to empower the circuit resource elements on said digital module and to ground the Source terminals of said group of FETs;

(c) thirdly, connecting a pin of approximate length ½ L to provide N volts through a delay circuit to charge the gates G of said group of FETs and permit current conduction therethrough;

(d) fourthly, connecting a ground pin of approximate length ¼ L, to the Drain (D) terminals of said group of FETs in order to carry the current load and to shut off conduction through said group of FETs.

6. The method of claim 5 which includes the step of:

(e) fifthly, connecting signal pin connections to said electronic resource elements after the N-volt power source has empowered said digital module.

* * * * *